United States Patent [19]

Domanik et al.

[11] Patent Number: 6,118,581

[45] Date of Patent: *Sep. 12, 2000

[54] MULTIFUNCTIONAL CONTROL UNIT FOR A MICROSCOPE

[75] Inventors: Richard A. Domanik, Libertyville; Dennis W. Gruber, Arlington Heights; Peter P. Gombrich, Chicago; William J. Mayer, South Barrington, all of Ill.

[73] Assignee: AccuMed International, Inc., Chicago, Ill.

[*] Notice: This patent is subject to a terminal disclaimer.

[21] Appl. No.: 08/768,711

[22] Filed: Dec. 18, 1996

Related U.S. Application Data

[63] Continuation-in-part of application No. 08/529,198, Sep. 15, 1995, abandoned, and a continuation-in-part of application No. 08/529,188, Sep. 15, 1995, Pat. No. 5,930,732.

[51] Int. Cl.⁷ .......................... G02B 21/00; G02B 21/26
[52] U.S. Cl. ...................... 359/392; 359/368; 359/391; 702/31
[58] Field of Search ............................ 359/368, 380–384, 359/391–395; 422/61–68, 104; 235/494, 464, 470; 702/31

[56] References Cited

U.S. PATENT DOCUMENTS

| 3,416,250 | 12/1968 | Schweers | 206/456 |
|---|---|---|---|
| 3,418,456 | 12/1968 | Hamisch et al. | 235/464 |
| 3,600,556 | 8/1971 | Acker | 235/464 |

(List continued on next page.)

FOREIGN PATENT DOCUMENTS

| 849379 | 8/1970 | Canada . |
|---|---|---|
| 1272285 | 7/1990 | Canada . |
| 1299179 | 4/1992 | Canada . |
| 1304612 | 7/1992 | Canada . |
| 2042075 | 11/1992 | Canada . |
| 2086785 | 4/1994 | Canada . |
| 2086786 | 4/1994 | Canada . |
| 453 239 A1 | 10/1991 | European Pat. Off. . |
| 577 084 A2 | 1/1994 | European Pat. Off. . |
| 195 48 091 A1 | 7/1996 | Germany . |
| 63-305510 | 12/1988 | Japan . |
| 1 439 986 | 6/1976 | United Kingdom . |
| 2 145 544 | 3/1985 | United Kingdom . |
| 2 212 301 | 7/1989 | United Kingdom . |
| 2 219 104 | 11/1989 | United Kingdom . |
| WO 87/01214 | 2/1987 | WIPO . |
| WO 90/07162 | 6/1990 | WIPO . |
| WO 93/16436 | 8/1993 | WIPO . |

OTHER PUBLICATIONS

Brugal et al, "Introduction to Cytometry and Histometry". First Comett International Course on Microscope Imaging in Biology and Medicine, Grenoble–France, Jan. 1992.

"Autostage System," Photonics Spectra, p. 165, Jun. 1994.

"Nikon Biostation® creates a fully automated cytology workstation in your laboratory," Nikon Inc. Instrument Group, Melville, NY, Feb. 1994.

*Primary Examiner*—Thong Nguyen
*Attorney, Agent, or Firm*—McDonnell Boehnen Hulbert & Berghoff

[57] ABSTRACT

A machine, method and medium for implementing functions using an input device in a manner that enhances efficient operation of a mechanism capable of operating in at least two states. The functions are implemented via a convenient input device, such as a mouse. One or more specified actuators of the input device implement a given function when the mechanism is in a first state, while at least one of those actuators implements a different function when the mechanism is in a second state. In embodiments of the present invention contemplating that the mechanism is a microscope system, two states in which the microscope system is envisioned to operate are a scan state and a pause state. The scan state allows the microscope system to execute a pre-defined scan sequence, while the pause state allows the microscope system to pause from that sequence.

24 Claims, 6 Drawing Sheets

U.S. PATENT DOCUMENTS

| | | | |
|---|---|---|---|
| 3,745,314 | 7/1973 | Mathias et al. | 235/470 |
| 3,851,972 | 12/1974 | Smith et al. | 356/72 |
| 3,902,615 | 9/1975 | Levy et al. | 414/331 |
| 4,141,458 | 2/1979 | Brooks et al. | 414/331 |
| 4,142,863 | 3/1979 | Covington et al. | 422/63 |
| 4,175,860 | 11/1979 | Bacus | 356/39 |
| 4,250,405 | 2/1981 | Ashcroft et al. | 235/456 |
| 4,367,915 | 1/1983 | Georges | 359/385 |
| 4,402,613 | 9/1983 | Daly et al. | 356/446 |
| 4,422,105 | 12/1983 | Rodesch et al. | 386/83 |
| 4,427,332 | 1/1984 | Manriquez | 414/331 |
| 4,449,042 | 5/1984 | Hampson et al. | 235/464 |
| 4,588,341 | 5/1986 | Motoda | 414/788.4 |
| 4,628,193 | 12/1986 | Blum | 235/375 |
| 4,658,960 | 4/1987 | Iwasa | 206/459.1 |
| 4,858,014 | 8/1989 | Zeevi et al. | 348/206 |
| 4,965,725 | 10/1990 | Rutenberg | 382/224 |
| 5,021,218 | 6/1991 | Davis et al. | 422/104 |
| 5,081,038 | 1/1992 | Sugaya et al. | 436/46 |
| 5,154,889 | 10/1992 | Muraishi | 422/65 |
| 5,209,903 | 5/1993 | Kanamori et al. | 422/65 |
| 5,237,327 | 8/1993 | Saitoh et al. | 341/176 |
| 5,245,530 | 9/1993 | Taki | 364/167.01 |
| 5,260,556 | 11/1993 | Lake et al. | 235/494 |
| 5,270,006 | 12/1993 | Uchigaki et al. | 422/63 |
| 5,287,182 | 2/1994 | Haskell et al. | 348/500 |
| 5,287,272 | 2/1994 | Rutenberg et al. | 382/224 |
| 5,332,549 | 7/1994 | MacIndoe, Jr. | 422/63 |
| 5,364,790 | 11/1994 | Atwood et al. | 435/287.2 |
| 5,380,488 | 1/1995 | Wakatake | 422/65 |
| 5,513,013 | 4/1996 | Kuo | 358/448 |
| 5,526,258 | 6/1996 | Bacus | 382/129 |
| 5,712,725 | 1/1998 | Faltermeier et al. | 359/392 |

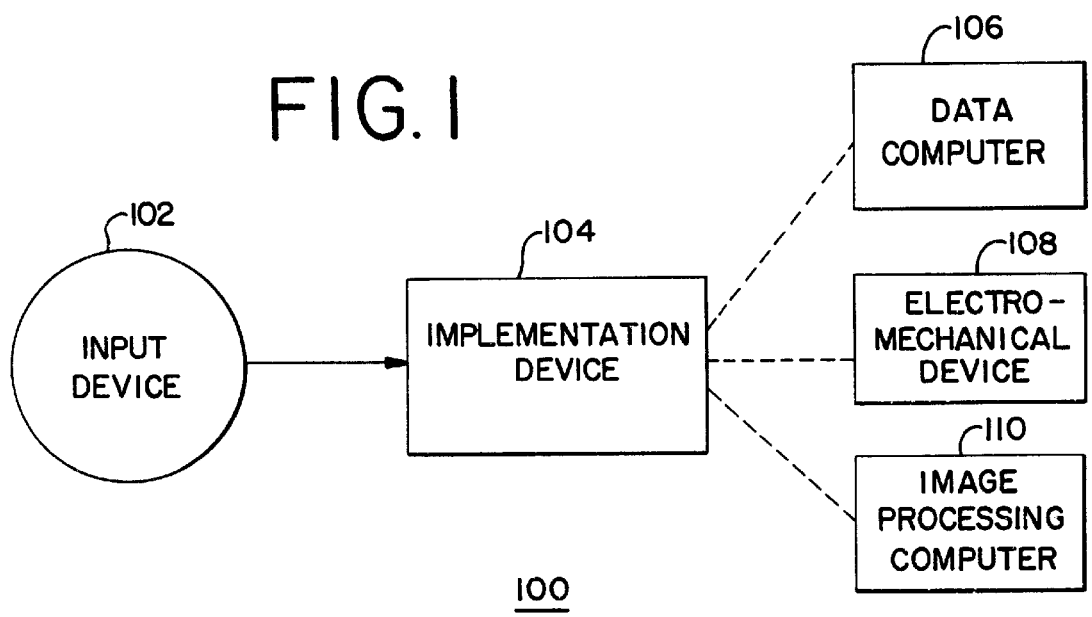
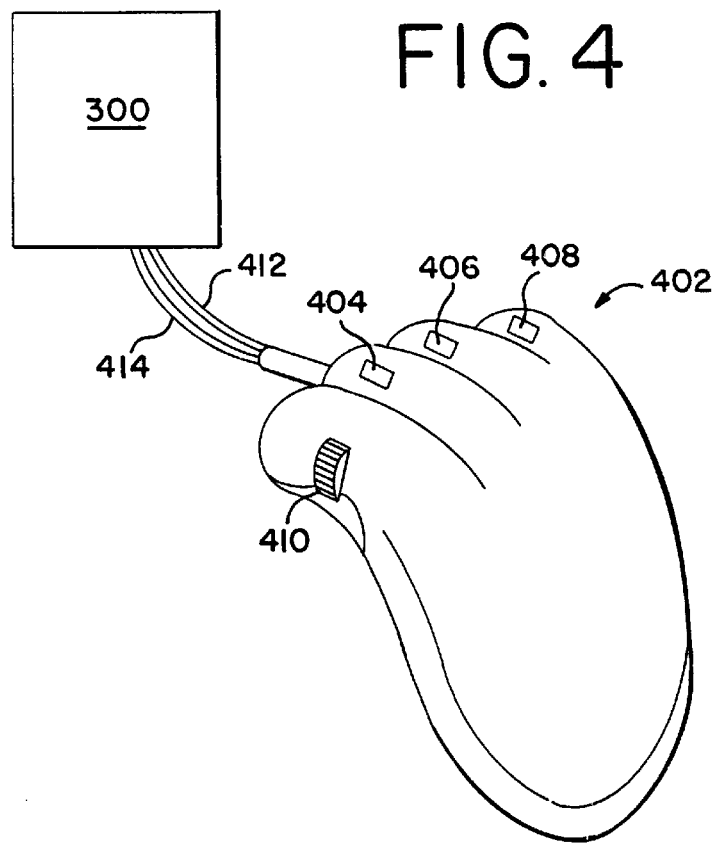

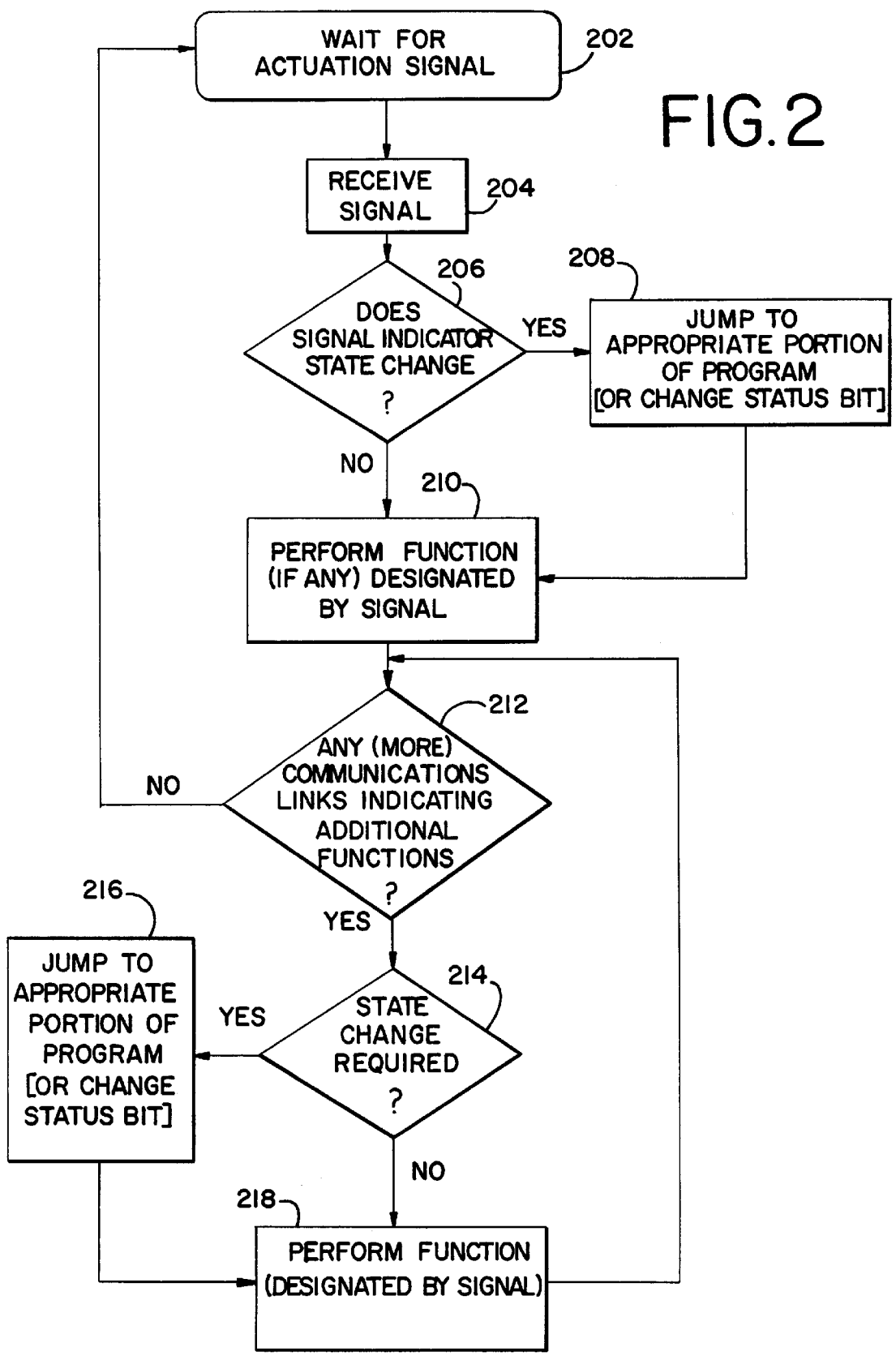

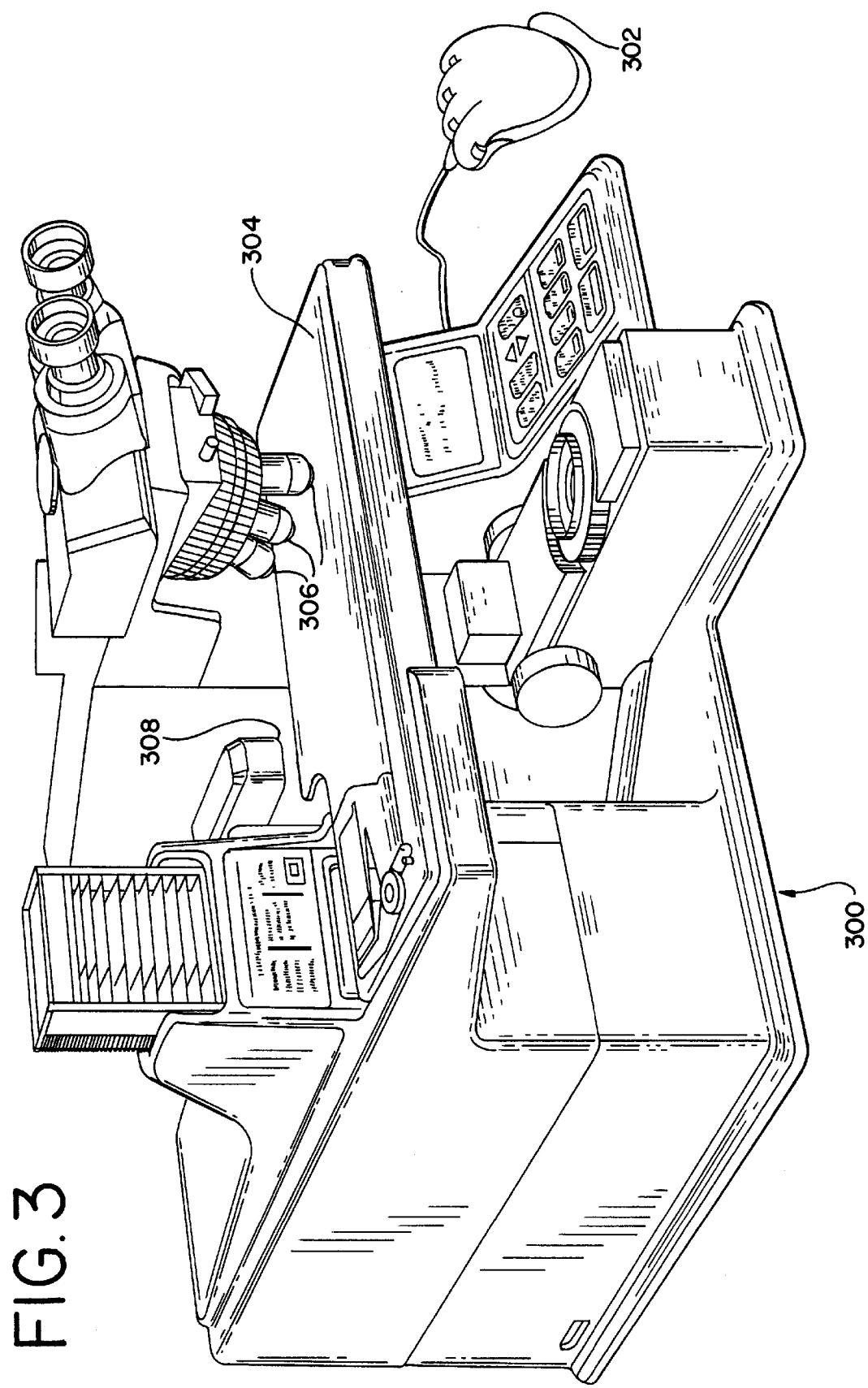

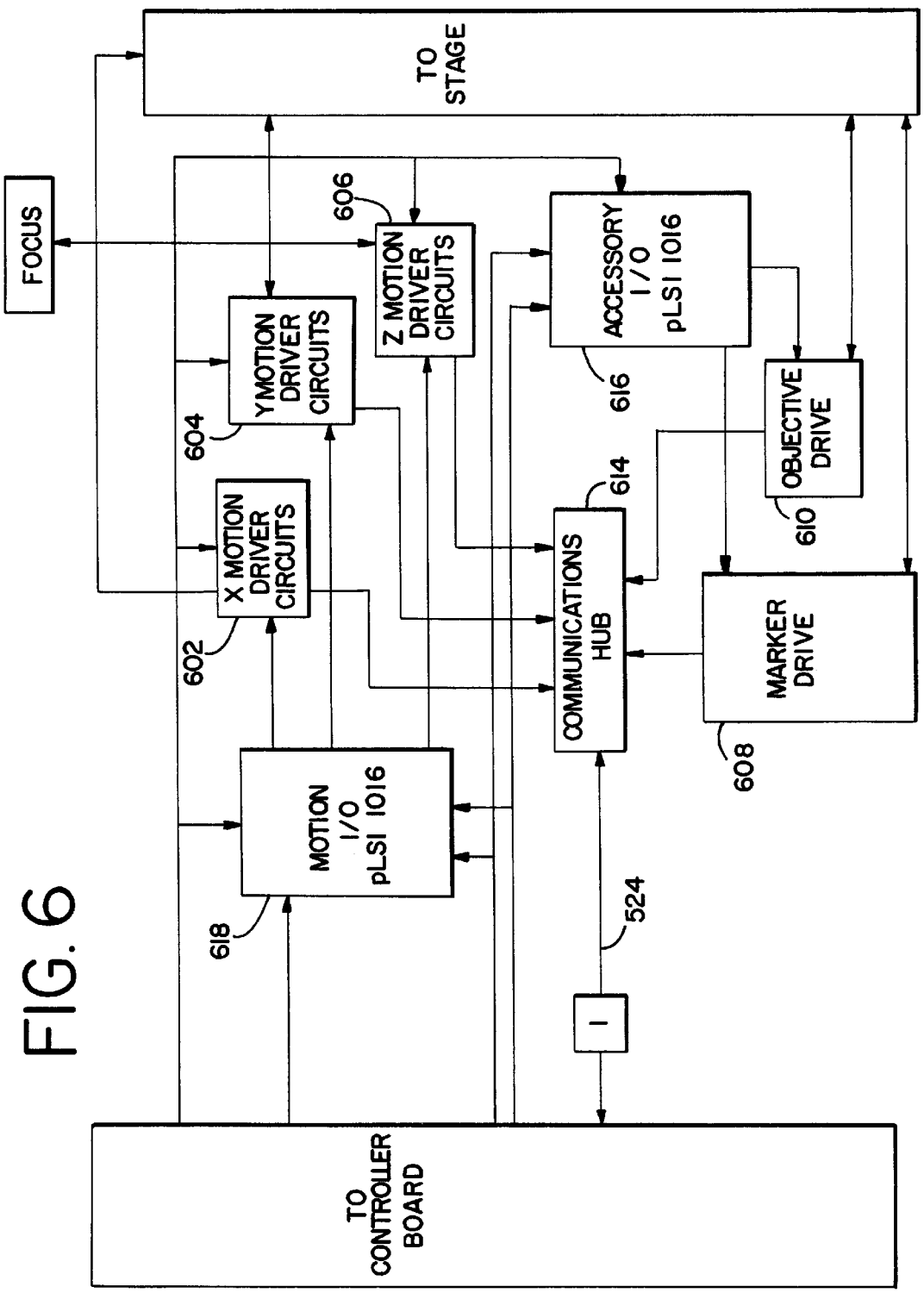

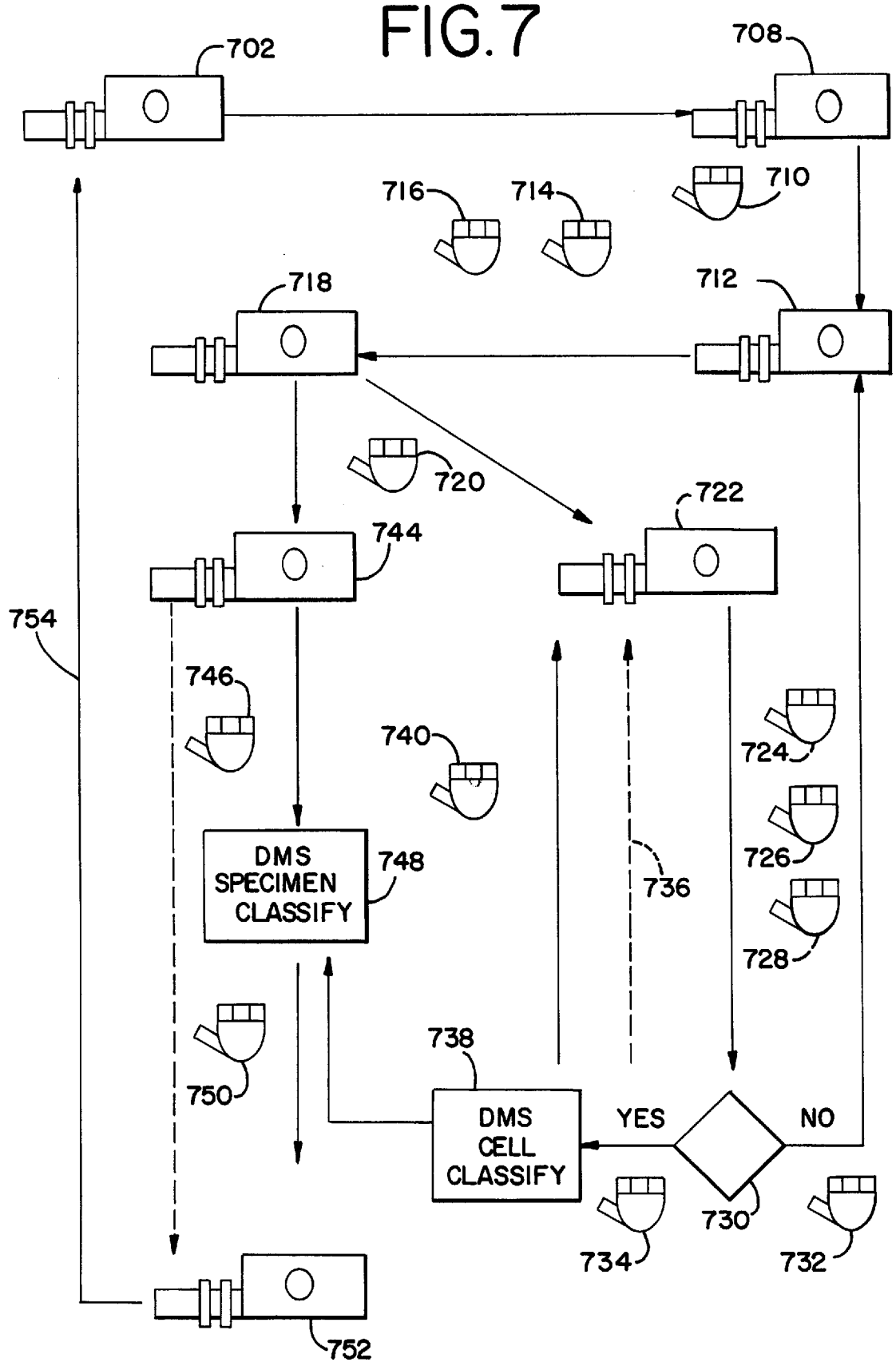

MULTIFUNCTIONAL CONTROL UNIT FOR A MICROSCOPE

CROSS REFERENCE TO RELATED APPLICATIONS

The present application is a continuation-in-part of U.S. Ser. No. 08/529,198 entitled "Multi-Functional Control Unit for a Microscope," filed on Sep. 15, 1995, now abandoned and is also a continuation-in-part of U.S. Ser. No. 08/529,188 entitled "System for Simplifying the Implementation of Specified Functions" filed on Sep. 15, 1995, now U.S. Pat. No. 5,930,732. The present application is also related to the following applications:

Co-pending U.S. patent application Ser. No. 08/528,789, filed Sep. 15, 1995, still pending, entitled "Automated Specimen Handling System and Method for Sorting the Specimens";

Co-pending U.S. patent application Ser. No. 08/529,220, filed Sep. 15, 1995, now abandoned, entitled "Cytological Specimen Analysis System with Individualized Patient Data";

Co-pending U.S. patent application Ser. No. 08/529,197, filed Sep. 15, 1995, now abandoned, entitled "Three Dimension Mouse";

Co-pending U.S. patent application Ser. No. 08/528,793, filed Sep. 15, 1995, now abandoned, entitled "Specimen Management System"; and Co-pending U.S. patent application Ser. No. 08/528,791, filed Sep. 15, 1995, now U.S. Pat. No. 5,690,892, entitled "Cassette for Use with Automated Specimen Handling System."

Each of the above applications is assigned to the assignee of the present application and is incorporated by reference.

FIELD OF INVENTION

The present invention is directed generally to the field of controlling functions performed by computerized devices and more particularly to the field of controlling functions performed by an optical microscope.

BACKGROUND OF THE INVENTION

The routine operation of an optical microscope requires the frequent adjustment of multiple controls including, but not limited to those for specimen position, focus and magnification selection. In traditional microscope designs, the locations of these controls have been determined primarily by functional and engineering considerations. Specimen positioning controls have been, for example, typically located in the plane of the microscope stage which holds the specimen. The X- and Y- stage position controls, to effect movement of the stage, have been typically spaced apart and are often at right angles to each other. This approach has resulted in simple, robust microscope designs that have offered accurate adjustability. Such designs are, however, difficult for an operator to use on an extended basis due to the need for the operator to continually be changing hand position and reaching to grasp controls dispersed over a substantial spatial volume. In many cases, operator access to these controls has been also limited either by control orientation or by access paths being blocked by other microscope components.

Newer microscope designs incorporate features that address the ergonomic aspects of microscope use. The specimen positioning controls in these designs, for example, are typically oriented perpendicular to rather than in the plane of the microscope stage. A further change has been to make the X- and Y- axis stage position controls coaxial such that both controls can readily be addressed by one hand with minimal change in hand position. Similarly, focus controls are typically located near the base of the microscope frame rather than in the traditional position higher up on the support column. These changes improve the ergonomics of microscope utilization by clustering the most frequently used controls in a limited spatial volume between the work surface and the stage that is not obstructed by other microscope components. However, while these newer designs represent a substantial ergonomic improvement over traditional designs, it has been well documented that extended use of such microscopes can result in repetitive motion and other ergonomically related injuries to the operator.

Numerous attempts have been made to further improve the ergonomic aspects of microscope operation by motorizing the most common control functions. These approaches replace the manual actuators for specimen position, focus and, occasionally magnification selection, with electric (or rarely hydraulic or pneumatic) actuators. The operator controls for these "motorized" microscopes are housed in one or more units that are physically separate from the microscope and connected to the microscope by electrical cables. The remote control units are typically in the form of consoles or boxes housing the necessary operator controls, but are occasionally in the form of a computer keyboard or similar device. Some, but by no means all of these devices improve the ergonomics of microscope utilization over that of an otherwise identical non-motorized microscope.

One limitation of such devices is the proliferation of controls that must be accessed by the operator. For example, magnification selection on a non-motorized microscope is typically controlled by manually rotating a ring located on the microscope nosepiece. The motorized equivalent typically utilizes one selection control (for example, a pushbutton) for each of the four to six nosepiece locations. The number of controls that must be dealt with by the operator when performing this function therefore increases from one to four or more. Similar considerations pertain to specimen positioning and focus adjustment. Some effort has been made to combine related functions into a single multifunctional control. Examples include using a multi-position switch for magnification selection or joysticks to control stage speed and focus position. Even the best developed of these multi-function controllers, however, require the operator to frequently shift hand position in order to access the various controls.

The ergonomics of switch controllers are also suboptimal. Joystick controllers for example, require the operator's hand to rest in a non-neutral position and, in many designs, requires the use of fine rather than large muscle groups to exercise control. Both of these factors impose stresses on the muscles that may ultimately result in repetitive motion injury. The common practice of packaging such controls in a console or box raises the heights of these controls significantly above the level of the work surface and further contributes to muscle strain. In the worst designs, the transition between the work and control surfaces is in the form of a ledge against which the hand rests when using the controls. This continuous pressure against an edge has been shown in some conditions to result in neurological injury to operators.

It is accordingly a principle object of the present invention to combine all frequently accessed controls for a motorized microscope into a single multi-functional control unit.

A further object is to provide a multi-functional microscope control unit that relocates all frequently accessed control functions to approximately the level of the work surface.

Yet another object of the present invention is to provide a multifunctional microscope control unit that positions all frequently accessed controls to: a) minimize the amount of hand motion required to execute any control function; b) utilize major rather than fine muscle group motions to actuate the controls; and c) allow the operator's hand to remain in a neutral rest position while exercising these control functions.

SUMMARY OF THE INVENTION

In a principle aspect, the present invention takes the form of a multifunctional control unit which is operable to control multiple functions of a microscope. The microscope includes a motorized stage, slide holder and lens. The multifunctional control unit is useable by the user of the microscope to control all necessary functions of the microscope, such as loading of a slide into the slide holder, moving the slide holder and stage to effect two-dimensional movement of the specimen under the lens, select a lens, initiate scanning of the specimen and change the scanning speed, stop automatic scanning to enter a manual mode, manually cause movement of the specimen under the lens, and focus the lens. Other functions of the microscope are also controllable by the multifunctional control unit.

Preferably, the multi-functional control unit takes the form of a computer mouse which employs a spherical roller to transmit movements in a two-dimensional plane to control lateral movement of the specimen, and a thumbwheel to cause vertical movement of the lens for focusing. The mouse contains a plurality of buttons to actuate different functions of the microscope. The mouse may advantageously be positioned on a work surface which is at a comfortable height for the user. The user may control the microscope by way of natural and intuitive movements of the hands which places a minimum amount of stress on the user. As a result productivity of the user improves resulting in more accurate analysis of the specimen contained on the slide.

These and other features, advantages and benefits of the present invention may be better understood by considering the following detailed description of certain preferred embodiments of the invention. In the course of this description, reference will be made to the attached drawings.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIG. 1 is a block diagram depicting the general components of the present invention as contemplated by embodiments of the present invention;

FIG. 2 is a flow diagram of a method contemplated by embodiments of the present invention concerning implementation of functions based upon receipt of given signals and whether a state change is to occur;

FIG. 3 is a diagram of a microscope system as contemplated by embodiments of the present invention;

FIG. 4 is a diagram of a mouse input device example as contemplated by embodiments of the present invention;

FIG. 6 is a diagram depicting the driver circuits of the microscope system as contemplated by embodiments of the present invention; and FIG. 7 is a flow diagram example of the utilization of the microscope system as contemplated by embodiments of the present invention.

DETAILED DESCRIPTION OF THE PREFERRED EMBODIMENT

Figure 5:
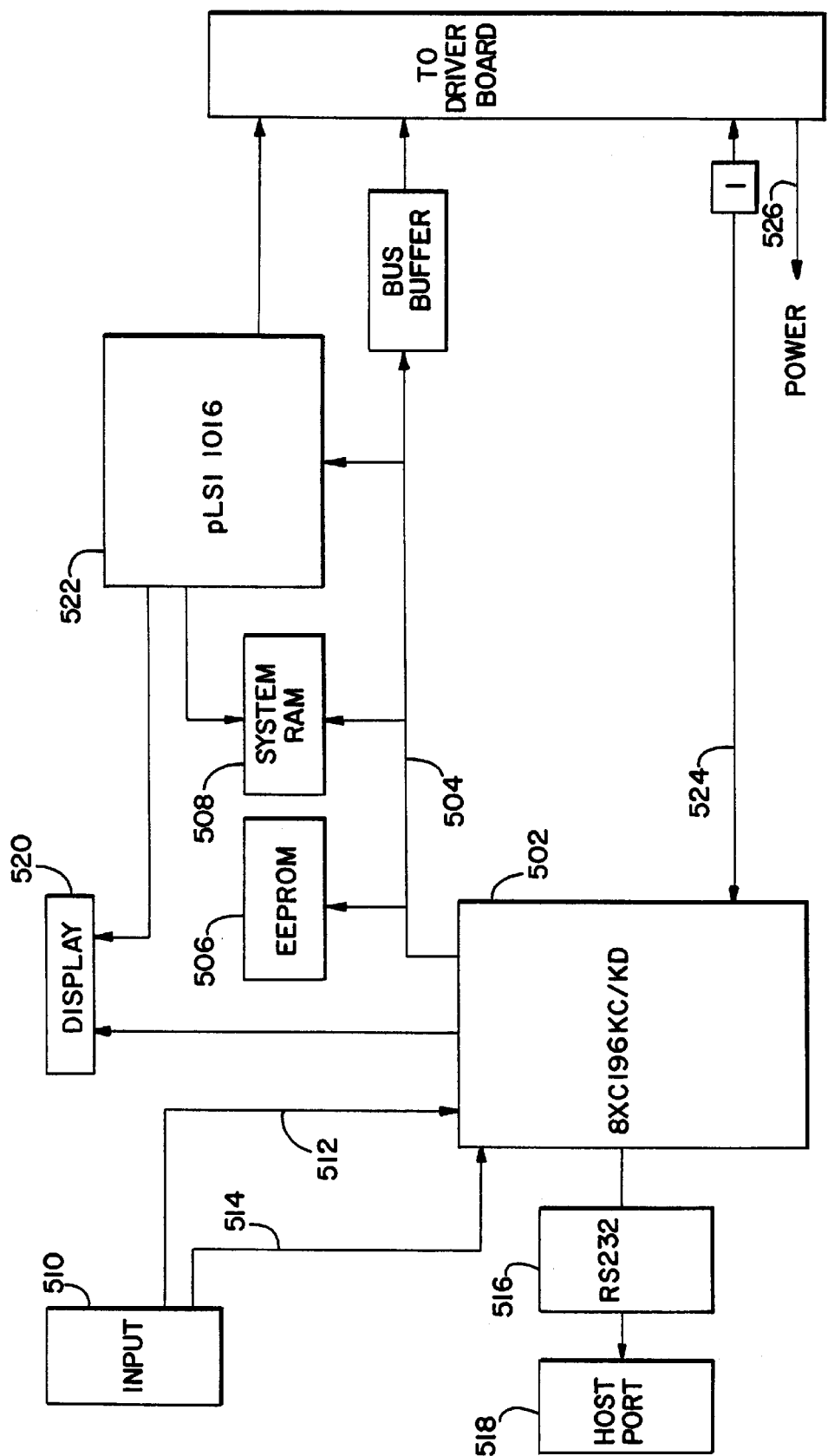
FIG. 5 is a circuit diagram depicting the controller board of the microscope system as contemplated by embodiments of the present invention.

Referring to FIGS. 1–7 the present invention relates to performing a plurality of specified functions, and for implementing those functions in a manner that enhances efficiency and reduces the complexity of the necessary controls. More specifically, the present invention relates to a machine, method and medium for implementing functions as mentioned above, utilizing a mechanism capable of operating in at least two states, and including (or utilizing signals from) a convenient (e.g., hand-held) input device where the functions implemented by the controls at any point in time depend upon the current state of the mechanism (i.e., upon the context in which the mechanism is operating at a given moment). Embodiments of the invention contemplate late that the specified functions can be those used in conjunction with a laboratory system microscope, utilizing a scheme such that the number of controls necessary to perform the functions are decreased, and the efficiency and intuitiveness of use of the microscope system is enhanced.

The present invention 100 is now further explained with regard first to FIG. 1. Referring to FIG. 1, an implementation device 104 is shown, which is capable of implementing a number of specified functions. Embodiments of the present invention contemplate that the implementation device is operable in two or more different states. Using an example where the implementation device 104 is some piece of earth-moving equipment such as a bulldozer, two possible states that it could operate in are "move" (i.e., move forward) and "park." The earth-moving equipment could have any number of user-implementable functions, including "speed up," "slow down," "lower stabilization supports," etc.

To reduce the number of controls that a user has to manipulate to implement the functions of the implementation device 104, the present invention contemplates the use of an input device 102 having two or more easily-accessible actuators (i.e., actuators that allow the user to better focus on watching the task at hand, decreasing the need to look for, or grope for, an appropriate input device or actuator). In addition, the present invention also contemplates that one or more of the actuators can mean two different things (i.e., implement two different functions) depending upon the state that the implementation device 104 is in (i.e., depending upon the context in which the implementation device 104 is used at a given point in time).

Using the earth-moving example mentioned above, one of the actuators might be implemented to mean "speed up" in the "move" state, but then mean "lower the stabilization supports" in the "park" state. This configuration might make sense to help reduce the number of actuators needed, since one would not want lower the stabilization supports of the earth-moving equipment while it is moving (i.e., in the "move" state), nor would it make sense to "speed up" when the earth-moving equipment is in the "park" state. Such an arrangement thus allows for a more intuitive organization of the controls, making operation of the implementation device 104 easier.

Embodiments of the present invention contemplate that the implementation device 104 can be any number of different types of electromechanical and/or computer devices. As can be appreciated, the appropriate functions associated with the actuators on the input device 102 will depend upon the nature of the implementation device 104 and the functions that it is capable of implementing. However, as indicated above, it is contemplated that the implementation device 104 is capable of operation in two or more states, wherein a change from at least one of the states to another causes at least one actuator on the input device 102 to change function from the previous state.

Concerning the input device 102, at least some embodiments of the present invention contemplate that the input device 102 is some hand-held device such as a mouse, track ball or similar type device. However, it should be understood that the present invention contemplates a variety of other types of input devices as well.

In addition to the use of the implementation device 104 by itself, the present invention also contemplates that other types of devices can be used in conjunction with (or as a part of) implementation device 104, and controllable via the input device 102. For example, embodiments of the present invention contemplate that a data computer 106 can be linked to the implementation device 104 such that control of the data computer 106 can be accomplished by the input device 102 via the implementation device 104.

Using the earth-moving scenario as an example of input device 102 control of the data computer 106, assume that the weight of material lifted by each scoop of a shovel attached to the earth-moving equipment is to be recorded. Also assume that the user's comments concerning the nature of the material lifted by the shovel are also to be recorded, along with the weight. Then, the present invention envisions that an actuator on the input device 102 can be set to lift the material into the shovel and raise it to a certain position for viewing by the user. During the raising of the shovel (representing a first state), the other actuators may have various functions, such as "emergency stop" or "shine light on material."

Once the shovel has been raised to the appropriate position, the implementation device 104 might then be placed into a second state (e.g., by virtue of the shovel reaching the appropriate position, as initiated by the actuator mentioned above). In this second state, the weight of the material might automatically be fed into the data computer 106. Also, the same actuator of the input device 102 that was used to lift the shovel in the first state might then be used to control the data computer 106, such as for allowing the user to select a type of material (e.g., from a menu) representative of the material seen in the shovel. Thus, it is contemplated that the present invention effectively links the data computer 106 with the implementation device 104 in a way that allows the implementation device 104 and the data computer 106 to be controlled by the same input device 102 in an efficient manner.

Embodiments of the present invention contemplate that the implementation device 104 and the data computer 106 can be linked using any number of schemes, including communication between RS232 ports, with an appropriate communication protocol. It is also contemplated that the implementation device 104 has some type of control mechanism, such as a processor, that can interpret signals received from input device 102 and manipulate the various servos and external devices that may be associated with it. In general, the control mechanism must also be able to implement the function that is appropriate given the current state of the implementation device 104, in accordance with some stored program (not shown) associated with the processor. An example of a processor and various components contemplated for use with embodiments of the present invention will be discussed further below, in conjunction with a specific microscope system example.

In addition to data computer 106, the present invention contemplates that any number of different types of devices can also be associated with implementation device 104, such as an electromechanical device 108 or an image processing computer 110 (or any other type of computer, for that matter). Due to the linkage of these external devices, it is contemplated that implementation device 104 automatically detects the presence of any external devices.

Various methods of operation as contemplated by embodiments of the present invention are shown by FIG. 2. Referring now to FIG. 2, the present invention contemplates waiting for some type of actuation signal (e.g., depression of a mouse button, etc.) as indicated by a block 202. When the signal is received (indicated by a block 204), a determination is then made concerning whether the signal indicates a change of state (via the current context of some implementation device), as indicated by a decision block 206. If there is no change of state, then the designated function is performed, as indicated by a block 210. An example of that situation can be envisioned using the earth-moving scenario, where the received signal might cause a light to shine into the shovel, but not affect the function of any other actuators.

However, the received signal might, instead, indicate a change in state. An example of this situation might be where an actuator was actuated (and signal received) to put the earthmoving equipment into the "move" state, thus changing the function of various actuators. In that situation, embodiments of the present invention contemplate that an appropriate portion of the stored program is "jumped to" (i.e., control is passed to that portion) so that the actuation of the actuators will result in the intended actions (given the current state). Thus, in this example, the appropriate portion of the program will be executed by the processor such that a signal received from a particular actuator will be interpreted as a request to "speed up" rather than to "lower stabilization supports." This type of occurrence is indicated by a block 208.

In other embodiments contemplated by the present invention, a status bit is changed when the state is to be changed, as also indicated by block 208.

After block 208, the next step is that the function designated by the signal is then performed (if any), as indicated by block 210. The "if any" indicates that the received signal might indicate only that a change in state is to take place (i.e., at least one of the actuators will change functions), but that no specific function is yet to be performed.

It should be understood that embodiments of the present invention also contemplate situations where the performance of a function (as indicated by block 210) may precede the changing of a given state (as indicated by block 208).

The next step is to determine whether there are any communications links indicating that additional functions should be performed, as indicated by a decision block 212. This would be the case where, for example, an external device such as data computer 106 is linked to the implementation device 104. If there are no communications links, control goes back to block 202, and another actuation signal is waited for.

If, however, communications links are detected, then the next step will be to determine whether a state change is required, as indicated by a decision block 214. (Often, just prior to reaching decision block 214, embodiments of the present invention contemplate that an actuation signal will be waited for, in the same way as was done regarding block 202). If a state change is required, then the next step is to jump to the appropriate portion of the program (or change the status bit) as indicated by a block 216. This typically will occur when a function is to occur that affects the external device. Thus, this can be thought of as placing the implementation device into an "external state." It should be understood, however, that the present invention contemplates utilizing any number of different states, as well.

The next step (from decision block 214 if no state change is required, or from block 216 if a state change is required) is to perform the function designated by the signal, as indicated by a block 218. Then, a determination is made as to whether any more communication links exist indicating that additional functions may need to be accounted for, as further indicated by decision block 212.

It should, of course, be understood that the present invention contemplates a variety of configurations beyond what is depicted by FIG. 2, and that embodiments depicted by FIG. 2 are disclosed by way of example.

Embodiments of the present invention relating specifically to a microscope system will now be described, beginning with a discussion of FIG. 3. Referring now to FIG. 3, a microscope system 300 is shown, having a variety of components. The components and their functionality as discussed below are given by way of example, as the present invention contemplates that any number of different types of components and functions can be used in such a microscope system.

In the particular example discussed here, it is contemplated that components such as various optical components are from an Olympus BX-40 microscope from Olympus Optical Corporation of Tokyo, Japan, although any number of different microscope components could also have been used. In addition, embodiments of the present invention contemplate that the microscope system 300 includes a motorized stage 304 upon which a slide containing a specimen can be placed for viewing. Embodiments of the present invention also contemplate that an automated scan sequence can be executed for moving the stage 304 through various positions so that a specimen can be efficiently viewed. When a scan sequence is being executed, the microscope system 300 can be thought of as being in a "scan" (or "resume") state. The scan sequence can also be paused at a given period of time, allowing the stage 304 to be positioned manually. This state is referred to as the "pause" state.

Other functions that microscope system 300 automates includes the ability to change objectives 306 of the microscope, and the ability to focus the microscope by moving the objectives 306 toward or away from the specimen on stage 304. Another function contemplated allows a portion of the slide to be logically marked for future reference, and when the scan sequence is completed, to then physically mark the slide at the spot or spots at which it was logically marked at, using a print device 308.

According to embodiments of the present invention, the functions mentioned above are envisioned as being controlled via a single input device, such as the one shown by an input device 302. Here, the input device is shown to be a mouse, although any number of convenient input devices are contemplated. In any event, the present invention contemplates that input device 302 has one or more actuators whose functions can vary in accordance with the current state of the microscope system 300. In this way, more functions can be assigned to the input device 302 (in the course of the operation of the microscope system 300) than there are actuators on the input device 302. Moreover, this implementation also allows for a plurality of functions to be executed in an efficient and intuitive manner.

Various embodiments of the present invention contemplate that the input device 302 could be of a type shown by FIG. 4. Referring now to FIG. 4, a mouse 402 having three buttons (404,406,408), a track ball (on the underside of mouse 402) and a thumb wheel 410 are shown. To change the state of the microscope system 300, the assigned functionality could be, for example, that the left button 404 toggles the microscope system 300 between executing the scan sequence and pausing (and, thus, between the scan state and pause state).

When operating in the scan state, embodiments of the present invention contemplate that movement of the mouse 402 in a first direction (e.g., to the left) will increase the speed at which the scan sequence executes, while movement of the mouse 402 in a second direction (e.g., to the right) will decrease the speed. Thus, in the example embodiments, the "track ball" portion of the mouse 402 is the actuator that controls the scanning speed while the microscope system 300 is in the scan state.

When the microscope system 300 is in the pause state by virtue of actuation of the left button 404, movement of the mouse will then manually position the stage 304. Also, while in the pause state, embodiments of the present invention contemplate that the objectives 306 can be changed by, for example, the right button 408, while objects in the specimen can be logically marked by, for example, the middle button 406. While the microscope system 300 is in the scan state, it is contemplated that the center and right buttons 406 and 408 are deactivated, thus, not allowing for the marking or changing of objectives 306. However, it should be understood that other embodiments of the present invention contemplate that those actuators can nonetheless retain these functions (or have any number of other functions, for that matter) during the scan state.

Lastly, embodiments of the present invention as depicted by FIG. 4 contemplate that the mouse 402 will have a thumb wheel 410 for allowing the microscope system 300 to be focused. It is contemplated that function can be used in either the scan or the pause state. In one embodiment using a modified "Sicos" mouse (from Mouse Tracks of Nevada), the same or similar type of encoder disk used for the x and y coordinates (i.e., for the track ball portion) is also contemplated for use with the thumb wheel, although the precise implementation is not crucial for purposes of the present invention. In any event, it should be understood that the function of focusing the microscope system 300 could also be implemented using one of the other actuation devices, such as one of the buttons (and, thus, depending upon the implementation, it may be desirable in that situation to use a four-button mouse).

The specific configuration of the actuators used with the mouse 402 of FIG. 4 and assignment of functions thereon have been found to be particularly efficient in allowing a user to intuitively control the various features of microscope system 300. However, it should be understood that the present invention contemplates that the actuators of the mouse 402 of FIG. 4 could be configured in any number of other ways to perform the above-mentioned functions, as well as any number of additional functions, as well. Also, as stated above, the present invention contemplates that a variety of other types of mouse or other input devices could be used. However, for more information concerning the specific example mouse 402 shown by FIG. 4, see the patent application which is entitled "Three Dimensional Mouse," filed by Domanik, Gombrich, Gruber, Gunther, and Mayer on the same day as the present application, and which, as discussed above, is incorporated by reference herein.

In addition to controlling the functions on the microscope system 300, embodiments of the present invention also contemplate that functions on external devices such as a data management system ("DMS") (not shown in FIG. 3) can also be controlled using the input device 302 (such as the one of FIG. 4) via microscope system 300. Thus, for example, after a specimen is marked, as described above, a menu appears on the DMS, allowing a user to select a description of the specimen from a number of possible pathologies. This selection takes place by using, for example, the middle mouse button 406 of mouse 402. In this way, the actuator previously used to mark the specimen (while the microscope system 300 was in a first state) is then is used to select a description of the specimen (while the microscope system 300 is in a second state). Again, this is not only efficient, but intuitive, since a user can use the same actuator (to perform this second needed function) in the second state that brought the microscope system 300 into that second state to begin with. Also, the movement of the mouse 402 is envisioned to position the cursor on the appropriate menu item in this situation. (In addition, it is envisioned that the coordinates of the "mark" are automatically sent to the DMS to be associated with the user's menu selection.)

Embodiments of the present invention contemplate that the DMS can utilize any number of different types of digital computer systems, such as those that are IBM PC-compatible and based upon an Intel 80×86 or Pentium processor from Intel Corporation of Santa Clara, Calif.

Of course, again, it should be understood that the present invention contemplates that the control of external devices could be accomplished in a manner other than that described above. In addition, embodiments of the present invention contemplate that external devices used with the microscope system 300 could also include any number of various types of electromechanical and other computer-type devices.

Various components allowing the present invention to perform the functions described above are now described with regard to FIGS. 5 and 6. Embodiments of the present invention contemplate that these components can reside within the microscope system 300, or that some or all of them can be part of a separate entity that is in communication with the microscope system 300.

Referring first to FIG. 5, this figure shows a controller board having a microprocessor 502. Although the invention contemplates that any number of different types of processor devices could be used, the embodiments shown in FIG. 5 depict an 8XC196 of the KC or KD variety from Intel Corporation. A bus 504 and a high speed serial sensor bus, 524 are in communication with the microprocessor 502, allowing it to communicate with other components. Such other components include an input device 510 for allowing a user to transmit signals representing specific functions that the user desires the microscope system 300 to implement.

As indicated above, the input device 510 could be any number of input-type devices. The configuration specifically shown in FIG. 5 contemplates use of a mouse similar to that shown by FIG. 4. Thus, a serial input line 514 (corresponding to a line 412 in FIG. 4) allows the microprocessor 502 to receive signals indicating the actuation of a mouse button or the movement of the track ball under the mouse, while a focus line 512 (corresponding to a line 414 in FIG. 4) is used to indicate the position of the thumb wheel for use in focusing the microscope.

Still referring to FIG. 5, embodiments of the present invention contemplate that an EEPROM 506 contains a program used to determine the appropriate operation resulting from the signals received from the input device 510. Embodiments of the present invention contemplate that an NM93C256 serial EEPROM from National Semiconductor of Santa Clara, Calif. can used, although any number of different types of EEPROMs are also contemplated by the present invention. In addition, storage of the program could be on any number of computer-readable storage devices, including various optical, magnetic, biological or atomic storage devices.

The specific programming language used with the present invention and stored in EEPROM 506 will depend upon the type of processor 502 used. In the embodiments shown by FIG. 5, it is contemplated that MCS96 assembly language is used. Of course, in this and other embodiments contemplated by the present invention, the programming language used could also be a high-level programming language either interpreted or compiled into the appropriate machine language. In any event, embodiments of the present-invention contemplate that the program used can be based upon the high-level pseudo-code given below:

```
-move slide to start point
-set line spacing based on FOV and OVERLAP
-set MOUSE actuator to Adjust Speed
-set MARK actuator to Mark Slide
-Press SCAN to Start Scan
        -set SCAN to Pause State
-scan as per preset pattern
        -adjust speed using MOUSE
-at end of row index, change direction and continue
-at end of scan area
        -set SCAN to Pause State
        -if coverage = 100% then:
            -transfer control to DMS if installed, else Exit
            -set MOUSE actuator to Position Cursor
            -set MARK actuator to Select From Menu
            -select specimen classification from menu using MOUSE & MARK
            -select specimen adequacy evaluation from menu using MOUSE & MARK
            -set MOUSE actuator to Position Stage
            -set MARK actuator to Mark Slide
            -DMS returns to Exit after specimen classification/report generation -if coverage< 100 % then
            -set SCAN to Scan State
```

-continued

```
                -press SCAN to move to start of first missed area and begin scan
                -set SCAN to Pause State
                -if coverage < 100% at end of missed area scan, loop, else GoTo 100%
Exit    -       if DOTTER installed & enabled
                -automatically dot electronically Marked cell locations
                -dot label end of slide to indicate screened and positive as appropriate
-return slide to load station
                -unload slide
-Press SCAN to continue
                -loop for next specimen
-To interrupt SCAN, press SCAN
                -set scan to Pause State
                -stage stops
                -stop position, direction & magnification recorded
                -set SCAN to Scan State
                -Objective Changer enabled (if installed)
                        -press OBJ to index
                -Electronic Cell Marking Enabled
                        -press MARK to electronically mark and transfer control to DMS
                -set MOUSE actuator to Position Stage
                -stage position follows MOUSE motion
                -press SCAN to resume autoscan
                        -set SCAN to Scan State
                        -stage goes to recorded stop point approaching from stored direction
                        -direction, default speed, and magnification restored
                        -OBJECTIVE & MARK disabled -set MOUSE actuator to Adjust Speed
                        -scan resumes as where interrupted at default speed
-Press MARK to electronically mark cell or SCAN to resume normal scanning
        -on MARK, control, coordinate data & Z-height transferred to DMS if installed, else continue
                        -set MOUSE actuator to Position Cursor
                        -Set actuator to Select From Menu
                        -cell coordinates, focus position & direction recorded in DMS record
                        -cell classification by selection from menu (select via mouse)
                                -use MOUSE to point to DMS screen items
                                -use MARK button to select DMS screen items
                -click DONE button to record information & return to Mark function
                        -set MOUSE actuator to Position Stage to allow Marking additional cells
                        -set MARK actuator to Mark Slide
                        -Go to Exit
```

A system RAM 508 can be used for any number of reasons, including the temporary storage of portions of the program in the EEPROM 506 for usage by the microprocessor 502. The system RAM 508 could be a variety of different types of DRAM or SRAM, but its function can also be performed by Flash memory, magnetic, optical or a variety of other appropriate memory devices.

To facilitate a communications link with an external device, as discussed above, embodiments of the present invention contemplate using an RS232 port 516 for connection with the host port 518 (i.e., the communications port of the external device). It is envisioned that detection an external device is accomplished by sending a query to the RS232 and observing if any device responds.

Also contemplated for use with embodiments of the present invention are a power line 526 to supply power to the various components, and various "glue logic" components, indicated by a block 522. Also shown in FIG. 5 are how various components of FIG. 5 interface with those shown by the "driver board" of FIG. 6.

Referring now to FIG. 6, X and Y driver circuits 602 and 604 control the motion of the stage 304 in accordance with signals received from the microprocessor 502. Thus, embodiments of the present invention contemplate that the X and Y motion driver circuit 602 and 604 are in communication with some type of servos (not shown) that control the movement of the stage 304. The exact configuration of the servos and how they are physically linked to the stage itself are not crucial to the present invention, nor are the precise type of driver circuits used. One example of what could be used for X and Y motion driver circuit 602 and 604, however, include SGS 6217 circuits made by SGS Thomson of Phoenix, Ariz.

Z motion driver circuits 606 are similarly in communication with one or more servos (not shown) that allow for the focusing of the microscope system 300. The Z motion driver circuits 606 could be, for example, an "H-bridge" manufactured by Allegro of Worcester, Massachusetts. Similarly, an objective drive 610 (e.g., an "H-bridge" using an 80C51 processor made by Intel) can be used to drive a servo that controls the changing of the objectives 306, and a marker drive 608 (e.g., a TM open collector contact closure) is used to drive the print device 308 for physically marking the slide. Also shown in FIG. 6 is a communications hub 614 and various other PLD's 616 and 618, used for "glue logic."

Again, it should be understood that the configuration and components shown by FIGS. 5 and 6 are by way of example only, and that embodiments of the present invention contemplate that various other configurations and components could, instead, be used.

An example of a sequence of steps as contemplated by embodiments of the present invention concerning the microscope system embodiments is shown with regard to FIG. 7. This sequence can be used, for example, for viewing pap smears. In discussing this figure, an input device similar to the type shown in FIG. 4 is used to diagrammatically illustrate the particular actuators envisioned to implement the various functions. However, it should be understood that reference to an input device similar to the one shown in FIG. 4 is for explanation purposes only, as is the discussion of FIG. 7, generally.

Referring now to FIG. 7, the first step is that a slide containing a specimen to be viewed is loaded onto the stage, as indicated by a block 702. The slide is then placed in a starting position (as defined by the scan sequence) as indicated by a block 708. At this point, the state of microscope system 300 is in the "pause" state.

When a user wishes to begin viewing the specimen, the left mouse button that toggles between the pause and scan states is pressed, as indicated by a mouse illustration 710. The automatic scan sequence then commences, as indicated by a block 712. During the scan sequence, the user may increase or decrease the speed of the sequencing by moving the mouse in a specified direction, as indicated generally by mouse illustration 714. Also, the user can adjust the focus by using the thumb wheel, as shown by mouse illustration 716.

If the user observes an item of interest on the slide and wants the scan sequence to stop, the user can depress the left mouse button, as indicated by mouse illustration 720. This puts microscope system 300 into the pause state, as shown by a block 722. While in the pause state, the position of a stage can be adjusted by moving the mouse in specified directions, as indicated by a mouse illustration 724. The focus can also be adjusted using the thumb wheel, as indicated by a mouse illustration 726, and the objectives can be changed by depressing the right button, as indicated by a mouse illustration 728.

While in the pause state, the user can then make a decision whether there is an item of interest (e.g., an abnormal cell), as indicated by a decision block 730. If no item of interest is believed to exist, the user can resume the scan sequence (i.e., the scan state) as indicated by a mouse illustration 732. However, if an item of interest is identified, the user can logically mark the relevant portion of the specimen, as indicated by a mouse illustration 734. If there is no communications link to a DMS 738 (or other external device), the user can then immediately resume the scan sequence (i.e., enter the scan state) by depressing the left button, as indicated by a mouse illustration 740 and a line 736.

If, however, there is a communications link to a DMS 738, the user can enter the type of abnormality found into the DMS 738. In embodiments contemplated by the present invention, the user can use the same actuator to select from a choice of possible abnormalities given to him or her from a menu. Embodiments of the present invention contemplate that information is automatically sent to the DMS 738 to indicate the position of the abnormality, as marked by the user. Thus, the location and type of abnormality are recorded by the DMS 738 and associated with each other. The user may then resume the scan sequence, as again indicated by mouse illustration 740, or can preempt the scanning and immediately end the viewing of that specimen, as indicated by a line 742.

Once the scan sequence has been completed, as indicated by a block 744, the user may then enter final results of the scan generally, as indicated by mouse illustration 746 and DMS screen 748. When the user depresses the left mouse button, as indicated at 750, the system exits the DMS and moves the slide to the slide marking position, as indicated by block 752. Once that has been completed (or if there is no DMS as indicated by a line 754), then embodiments of the present invention contemplate that the slide is physically marked at those portions that were previously logically marked by the user. After being marked at 752, the slide is automatically moved back to the loading position at 702.

In general, it should also be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention.

It is to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A multi-functional control unit which controls a plurality of functions of a first controlled system and a second controlled system, said first controlled system comprising a system for optically imaging microscopic subjects, said multi-functional control unit comprising a single housing manipulable by one hand of an operator, said housing adapted to be positioned upon a work surface convenient to a hand of an operator of said first controlled system and including a plurality of function control means for controlling certain functions of said first controlled system, at least one of said function control means being operable to control a plurality of said functions of said first controlled system, said function control means also being operable to control a plurality of functions of said second controlled system.

2. A multi-functional control unit as set forth in claim 1 wherein said first controlled system is a microscope which includes a motorized stage.

3. A multi-functional control unit as set forth in claim 2 wherein said second controlled system is a personal computer coupled to said microscope.

4. A multi-functional control unit as set forth in claim 2 wherein said single housing takes the form of a computer mouse which is moveable on said work surface by said operator, and wherein said function control means comprise a plurality of buttons on said mouse manipulable by said hand.

5. A multi-functional control unit as set forth in claim 4 wherein said mouse includes a thumbwheel rotatable by said hand to focus said microscope.

6. A multi-functional control unit as set forth in claim 5 wherein said stage is operable in a first mode in which movement of said mouse on said work surface causes corresponding movement of said stage, and wherein said stage is operable in a second mode in which said stage is moved automatically in a scan pattern and movement of said mouse causes changes in speed of said scan pattern.

7. A multi-functional control unit as set forth in claim 6 wherein said plurality of functions of said first controlled system comprises an objective selection function operated by manipulation of one of said buttons of said mouse to sequentially select one of a plurality of objectives on said microscope.

8. A multi-functional control unit as set forth in claim 7 wherein said plurality of functions of said first controlled system further comprises a logical marker function, operated by manipulation of one of said buttons of said mouse, to allow placement of a marker on a slide being viewed by said user on said microscope.

9. The multi-functional control unit as set forth in claim 1 wherein the first controlled system is operable in two or more states, an action taken by the first controlled system in response to the actuation of one of the function control means being determined autonomously by the first controlled system based upon the state in which the first controlled system is operating.

10. The multi-functional control unit as set forth in claim 1 wherein the second controlled system is operable in two or more states, an action taken by the second controlled system in response to the actuation of one of the function control means being determined autonomously by the second controlled system based upon the state in which the second controlled system is operating.

11. A multi-functional control unit which controls all stage and focus control functions of a microscope, said multi-functional control unit comprising a single device manipulable by one hand of an operator, said device designed to be positioned upon a work surface convenient to said hand of said operator, said single device including a plurality of function control means for controlling said stage and focus control functions of said microscope, at least one of said function control means being operable to control more than one of said stage and focus control functions of said microscope.

12. A multi-functional control unit as set forth in claim 11 wherein at least one of said function control means is operable to control a plurality of functions of a data management system which is coupled to said microscope.

13. A multi-functional control unit as set forth in claim 12 wherein said function control means which is operable to control more than one of said stage and focus control functions of said microscope performs at least one context sensitive control function which determines a second function to be performed by a second actuation of said function control means upon a first actuation of said function control means to perform a first function.

14. A multi-functional control unit as set forth in claim 13 wherein said function control means comprise:
   means, responsive to a first user input, for causing initiation of a scan pattern of a specimen positioned on said stage;
   means, responsive to a second user input, to cause the speed of said scan pattern to change;
   mean, responsive to a third user input, to cause focusing of said specimen;
   means, responsive to a fourth user input, to cause said scan pattern to pause to allow said user to view a desired portion of said specimen;
   means, responsive to a fifth user input, to cause movement of said stage in accordance with said fifth user input while said scan pattern is paused;
   means, responsive to a sixth user input, to cause selection of an objective of said microscope;
   means, responsive to a seventh user input, to cause generation of a logical marker which is indicative of a position desired to be marked by said user for subsequent viewing;
   means, responsive to an eighth user input, to cause resumption of said scan sequence; and
   means, responsive to a ninth user input, to terminate said scan sequence.

15. A multi-functional control unit as set forth in claim 14 wherein the multi-functional control unit takes the form of a computer type mouse, and wherein said second and fifth user inputs are generated by movement of said mouse on said work surface.

16. A multi-functional control unit as set forth in claim 15 wherein the first, fourth, sixth, seventh, eighth and ninth user inputs are each generated by manipulation of a predetermined button on said mouse.

17. The multi-functional control unit as set forth in claim 11 wherein the microscope is operable in two or more states, a function of the function control means changing depending upon the state in which the microscope is operating.

18. A microscope control system to control operation of a microscope comprising:
   a hand operated device adapted to be manipulated by a single hand of a user of said microscope and including a plurality of control buttons, at least one of said control buttons operable to perform a plurality of functions, said hand operated device being moveable by said user's hand to generate speed signals and being capable of generating a position signal and further including a rotatable wheel which generates focusing signals to control focusing of said microscope; and
   control means, responsive to control signals generated by said hand operated device upon actuation of said control buttons, said rotatable wheel and upon movement of said hand operated device, for controlling movement of a stage of said microscope and for controlling focusing of said microscope, said control means comprising:
   first context sensitive means, responsive to first and second actuation of a first of said control buttons, said first actuation causing initiation of a first microscope function and said second actuation on said microscope of a second function which is dependent on said first function; and
   second context sensitive means, responsive to first and second actuation of a second of said control buttons, said first actuation causing initiation of a first microscope function and said second actuation causing actuation on a personal computer, which is coupled to said control means, of a second function which is dependent on said first function.

19. A cytotechnologist work station comprising:
   a microscope which includes an electronically controlled stage and an electronically controlled focusing mechanism;
   a mouse, operable by a single hand of a user of said work station, to control movement of said stage and focusing of a lens of said microscope; and
   an electronic control unit which receives control signals from said mouse comprising,
   means, responsive to a first of said control signals, to initiate movement of said stage in a scan pattern;
   means, responsive to a second of said control signals, to stop movement of said stage when in said scan pattern;
   means, responsive to a third of said control signals, to cause movement of said stage in accordance with movement of said mouse; and
   means, responsive to a fourth of said control signals, generated by actuation of a button on said mouse, to perform a first function and to perform a second function, upon subsequent actuation of said button, said second function being determined by said first function.

20. A microscope control unit operable by a user of a microscope to control movement of a stage of said microscope and to control focusing of said microscope, said control unit comprising:
   means, responsive to a first user input, for causing initiation of a scan pattern of a specimen positioned on said stage;
   means, responsive to a second user input, to cause the speed of said scan pattern to change;
   mean, responsive to a third user input, to cause focusing of said specimen;
   means, responsive to a fourth user input, to cause said scan pattern to pause to allow said user to view a desired portion of said specimen;

means, responsive to a fifth user input, to cause movement of said stage in accordance with said fifth user input while said scan pattern is paused;

means, responsive to a sixth user input, to cause selection of an objective of said microscope;

means, responsive to a seventh user input, to cause generation of a logical marker which is indicative of a position desired to be marked by said user for subsequent viewing;

means, responsive to an eighth user input, to cause resumption of said scan sequence; and means, responsive to a ninth user input, to terminate said scan sequence.

21. A microscope control unit as set forth in claim 20 wherein said microscope is coupled to a data management system, said control unit further comprising:

means, responsive to a tenth user input, for selecting an abnormality from a plurality of abnormalities which are displayed by said data management system, said selection of said abnormality causing storage in said data management system of position information which indicates the position on said specimen of said selected abnormality.

22. A microscope control unit as set forth in claim 21 wherein said first, fourth, sixth, seventh, eighth and ninth user inputs are entered via one of three buttons on said control unit.

23. A microscope control unit as set forth in claim 21 wherein said second and fifth user inputs are entered by moving said microscope control unit along a surface positioned to be convenient to a hand of said user.

24. A microscope control unit as set forth in claim 21 wherein said control unit is shaped to be moved along a surface positioned to be convenient to a hand of said user and wherein said control unit comprises a plurality of buttons for entry of said first, fourth, sixth, seventh, eighth and ninth user inputs and wherein said control unit comprises a movement actuation unit, which causes entry of said second and fifth user inputs by movement of said control unit along said surface.

* * * * *